United States Patent [19]

Moffatt

[11] Patent Number: 5,108,505
[45] Date of Patent: Apr. 28, 1992

[54] WATERFAST INKS VIA CYCLODEXTRIN INCLUSION COMPLEX

[75] Inventor: John R. Moffatt, Corvallis, Oreg.

[73] Assignee: Hewlett-Packard Company, Palo Alto, Calif.

[21] Appl. No.: 702,437

[22] Filed: May 16, 1991

Related U.S. Application Data

[63] Continuation of Ser. No. 523,969, May 16, 1990, abandoned.

[51] Int. Cl.⁵ ............................................. C09D 11/14
[52] U.S. Cl. ........................................ 106/25; 106/22; 106/204
[58] Field of Search ................... 106/20, 22, 25, 204

[56] References Cited

U.S. PATENT DOCUMENTS

| | | | |
|---|---|---|---|
| 4,705,567 | 11/1987 | Hair et al. | 106/20 |
| 4,781,758 | 11/1988 | Gendler et al. | 106/20 |
| 4,830,671 | 5/1989 | Frihart et al. | 106/31 |
| 4,838,938 | 6/1989 | Tomida et al. | 106/22 |
| 4,886,549 | 12/1989 | Koci | 106/20 |
| 4,917,956 | 4/1990 | Rohrbach | 428/533 |

FOREIGN PATENT DOCUMENTS 56-14569  2/1981  Japan.
1-299083  12/1989  Japan.

*Primary Examiner*—Karl Group
*Assistant Examiner*—Helene Klemanski

[57] ABSTRACT

Inks for ink-jet printing have improved waterfastness by combining a water-insoluble dye with a cyclodextrin in a water-based vehicle.

22 Claims, No Drawings

WATERFAST INKS VIA CYCLODEXTRIN INCLUSION COMPLEX

CROSS REFERENCE TO RELATED APPLICATION(S)

This is a continuation of application Ser. No. 523,969, filed on May 16, 1990, now abandoned.

TECHNICAL FIELD

This invention relates to ink formulations for ink-jet printers, and, more particularly, to waterfast ink formulations, especially for thermal ink-jet printers.

BACKGROUND ART

Thermal ink-jet printers operate by employing a plurality of resistor elements to expel droplets of ink through an associated plurality of nozzles. In particular, each resistor element, which is typically a pad of resistive material measuring about 50 $\mu$m $\times$ 50 $\mu$m, is located in a chamber filled with ink supplied from an ink reservoir. A nozzle plate, comprising a plurality of nozzles, or openings, with each nozzle associated with a resistor element, defines part of the chamber. Upon energizing of a particular resistor element, a droplet of ink is expelled through the nozzle toward the print medium, whether paper, fabric, or the like. The firing of ink droplets is typically under the control of a microprocessor, the signals of which are conveyed by electrical traces to the resistor elements. By proper selection of the signals, alphanumeric and other characters are formed on the print medium.

The tight tolerances of the nozzles (typically 50 $\mu$m diameter) require that the ink not clog the nozzles. Further, repeated firings of the resistor elements, which must withstand about 10 million firings over the life of the ink cartridge, can result in fouling of the resistor element. Finally, the ink composition must be capable of interacting with the print medium, especially paper, to penetrate the paper without undue spreading, and they should be smear resistance and waterfast.

Inks are known which possess one or more of the foregoing properties. However, few ink compositions are known that possess all the foregoing properties, since an improvement in one property often results in the degradation of another property. Thus, many inks used commercially represent a compromise in an attempt to achieve an ink evidencing at least an adequate response in each of the foregoing considerations.

Further, with regard to preparing waterfast inks, prior work has concentrated on altering the dye molecule itself, such as modifying the backbone thereof or adding various functional groups thereto. While such efforts result in inks having improved waterfastness, nonetheless, organic reactions must be performed, which drives up the cost of the dye, and hence the ink.

European Patent Application 88301275.9 discusses the use of cyclodextrins in a recording liquid to enhance print quality. The inks comprise water-soluble dyes, with a maximum concentration of about 80 wt. % water.

It is desired to prepare an ink having a level of waterfastness achievable only by use of water-insoluble dyes and using commercially-available dyes and suitable additives. At the same time, it is important to develop ink formulations which have the desired improved waterfastness, but not at the expense of other properties.

DISCLOSURE OF THE INVENTION

In accordance with the invention, the waterfastness of an ink is improved by adding thereto a quantity of a cyclodextrin. Cyclodextrins, such as $\alpha$-cyclodextrin, $\beta$-cyclodextrin, and $\gamma$-cyclodextrin, form an inclusion complex with insoluble dyes. Due to the soluble nature of the cyclodextrins, aqueous-based inks containing at least 90% water may be made from otherwise insoluble dyes. As a result, no organic solvent is required to solubilize the dye, which might complicate the ink chemistry and its interaction with the ink-jet printhead. At the same time, surface tension and viscosity of the ink are not adversely affected by using the cyclodextrin-dye inclusion complex.

The amount of cyclodextrin used depends on the dye strength desired, and typically is about twice the dye concentration.

Inks which employ the cyclodextrin complexing agents are found to be more waterfast than inks not using these agents.

The inks are simply prepared by adding the desired cyclodextrin in the precalculated amount to a vehicle comprising water and one or more humectants and then adding the desired amount of water-insoluble dye thereto.

BEST MODES FOR CARRYING OUT THE INVENTION

Water-insoluble dyes are those dyes which evidence no appreciable dissolution of dye in water at room temperature. A water-insoluble dye, as used herein, is one in which its solubility in aqueous solvent (assuming <20% organic solvent) is so small that its optical density on various papers is <0.80. (This definition will vary slightly among paper brands and types, but should differ no more than $\pm$0.2.)

Water-insoluble dyes are most useful in inks in which the property of waterfastness is important, because once such inks are printed on paper, they will not smear in the presence of water. Examples of such water-insoluble dyes include solvent dyes, vat dyes and certain mordant dyes. These dyes are available in a variety of blacks and colors.

Examples of solvent dyes include Solvent Black (SB) 3, SB 5, SB 46, SB 48, Solvent Blue 36, Solvent Blue 59, Solvent Red 1, Solvent Red 24, Solvent Red 68, Solvent Yellow (SY) 13, SY 14, SY 33, and SY 93. Examples of vat dyes include Vat Black 9, Vat Black 25, Vat Blue 1, Vat Blue 6, Vat Red 10, and Vat Yellow 4. Examples of water-insoluble mordant dyes include Mordant Black 1, Mordant Black 9, Neazopon Black X52 from BASF Corp., Chemical Division (Holland, Mich.), Mordant Blue 1, Mordant Red 7, Mordant Red 9, and Mordant Yellow 26.

Incorporating such water-insoluble dyes in an ink poses many challenges. If the dyes are soluble in an organic solvent, that solvent is likely to be toxic or may react with the printhead of the printer, causing corrosion products and the like. On the other hand, such water-insoluble dyes cannot, of course, by definition be employed in water-base inks.

In accordance with the invention, cyclodextrins have been found to solubilize water-insoluble dyes in water-base inks. Cyclodextrins have a three-dimensional molecular structure having an empty space therein for accommodating the dye molecule. In particular, cyclodextrins comprise six or more $\alpha$-D-glucopyranose groups bonded through α-1,4 bonding to form a cyclic compound. α-cyclodextrin is formed by cyclization of bonding of six glucose molecules. β-cyclodextrin is formed by seven glucose molecules. γcyclodextrin is formed by bonding of eight glucose molecules.

The vehicle of the inks of the invention comprises at least about 90 wt. % water, and the balance one or more glycols and/or lactams. The high water concentration is required in order to maintain optimum viscosity, surface tension, and fluidity properties. Examples of glycols suitably employed in the practice of the invention include glycols such as ethylene glycol, diethylene glycol, propylene glycol, polyethylene glycol, etc., and pyrrolidones, such as 2-pyrrolidone. Usually, the glycol is present in an amount up to about 10%, with the balance water. The pyrrolidone is usually present in an amount of about 7 to 10%, with the balance water.

Other additives may be added to the ink, such as biocides (fungicides, bactericides), pH adjusters and buffers, drying time improvers, and the like, as is well-known in the art. All amounts are in terms of weight percent, unless otherwise specified. Such additives and the materials comprising the vehicle and dye are of a purity commonly found in normal commercial practice.

The concentration of the insoluble dye typically ranges from about 0.5 to 9 wt. %, and preferably about 4 to 5 wt. %, which is usually sufficient to achieve the desired optical density. Specific dyes may require more or less than this amount, however.

The concentration of cyclodextrin depends on the selected concentration of the dye. The cyclodextrin concentration is preferably at least about twice that of the dye. The excess cyclodextrin concentration is necessary due to the fact that some dyes form 2:1 cyclodextrin:dye complexes.

Since the solubility of cyclodextrin in water is limited, it will be appreciated that there is an upper limit to the amount of dye that can be used. In this connection, the α- and γ- forms, which are comparatively more soluble than the β- form, are preferred.

In the preparation of the ink, the vehicle is first prepared, and then the predetermined amount of the desired cyclodextrin is added. The predetermined amount of dye is then added and the mixture is heated to an elevated temperature, preferably about 40° to 60° C. for about 6 to 60 hrs. to form the complex between the dye and the cyclodextrin.

The biocides useful in this invention may be any one or more of the biocides that are commonly used with inks for thermal jet printers, for example, Ucarcide, available from Union Carbide, Specialty Chemical Division (Charleston, W.Va.).

The inks of this invention evidence enhanced waterfastness. Preliminary results were obtained for an ink containing Neazopon X52 (black) dye complexed by β-cyclodextrin in a vehicle comprising 5.5% by weight of diethylene glycol, 1 to 4% Neazopon X52, and α- or β-cyclodextrin. The results included data from a dye transfer test, crusting, and smear resistance (both alkaline and acidic). The results are tabulated below:

| Test | Dye Load | α-CD[1] | β-CD[2] | Black[3] | Black[4] |
|---|---|---|---|---|---|
| Dye | 1.35 OD | | 80 mOD+ | 500 mOD | 150 mOD |
| Transfer | 1.20 OD | 230 mOD | | | |
| Test | 0.93 OD* | | 57 mOD | | |
| | 0.79 OD* | | 40 mOD | | |
| | 0.64 OD | | 28 mOD | | |
| Crusting | 0.64 OD | 60–80 sec | 70–80 sec | | |
| | 1.3 OD | | | 600 sec | |
| Smear (Alkaline 2-pass) | 0.64 OD | 285 mOD | 86 mOD | | |
| | 1.33 OD | | | 450 mOD | 250 mOD |
| Smear (Acidic 2-pass) | 0.64 OD | 290 mOD | 153 mOD | | |
| | 1.33 OD | | | | 70 mOD |

Notes:
+extrapolated
*obtained by repetitively printing over sample
[1]Neazopon Black X52 = 4%, α-cyclodextrin = 10%, diethylene glycol = 5.5%, water = balance
[2]Neazopon Black X52 = 2%, β-cyclodextrin = 1.5%, diethylene glycol = 5.5%, water = balance
[3]Lithium-substituted Food Black 2 = 2%, diethylene glycol = 5.5%, pH buffer and biocide = 0.6, water = balance; water-soluble
[4]Direct Black 286, 287 = 2%, N-pyrrolidone = 7.5%, buffer and biocide = 0.9, water = balance In the foregoing Table, the dye transfer test was carried out as follows: equally spaced 3 mm solid ink fill bars were printed on paper with ink fired from a thermal ink-jet printer. Water was then dripped across the bars and allowed to dry. The optical density was then measured and reported as mOD. The larger the number, the poorer the waterfastness.

Crusting was tested as follows: dot patterns were fired periodically from a thermal ink-jet printer with the ink under investigation. The first occurrence of a misdirected dot was indicative of viscous crusting. The time required for this to occur was recorded as the crusting time. A higher value is indicative of lower crusting.

Smear was tested as follows: equally spaced 3 mm solid ink fill bars were printed on paper with the ink under investigation. An alkaline or acidic highlighter was smeared twice (2-pass) across the paper. The optical density of the white space between the bars was measured and reported as optical density. The larger the number, the poorer the smear.

It will be noted that the dye load is approximately half of what is required to develop a "good" black ink. Other parameters are at least similar to those of the experimental waterfast black ink and clearly better than those of the H-P black ink. As is evident from the Table, the cyclodextrin-based inks improve waterfastness by at least a factor of 2.

INDUSTRIAL APPLICABILITY

The ink formulations of the present invention can be used wherever aqueous inks are employed and there is need for a water-resistant print. They are, however, specifically designed to operate in a thermal ink-jet device, such as the DeskJet printer. DeskJet is a trademark of Hewlett-Packard Company.

Thus, there has been disclosed ink compositions evidencing improved waterfastness, employing water-insoluble dyes in an aqueous vehicle, using a cyclodextrin to complex the dye. Such inks evidence improved waterfastness on plain papers. It will be readily apparent to those skilled in the art that various changes and modifications of an obvious nature may be made without departing from the spirit of the invention. All such changes and modifications are considered to fall within the scope of the invention, as defined by the appended claims.

What is claimed is:

1. A liquid ink suitable for ink-jet printing, comprising, by weight:

(a) a vehicle comprising about 90 to 98 wt. % water and the balance at least one member selected from the group consisting of glycols and lactams;
(b) about 0.5 to 9 wt. % of a water-insoluble dye; and
(c) a cyclodextrin, present in an amount of at least about twice the concentration of said dye.

2. The ink of claim 1 wherein said cyclodextrin is selected from the group consisting of $\alpha$-cyclodextrin, $\beta$-cyclodextrin, and $\gamma$-cyclodextrin.

3. The ink of claim 1 wherein said dye is selected from the group consisting of solvent dyes, vat dyes, and insoluble mordant dyes.

4. The ink of claim 1 wherein said at least one glycol is present in a range from about 2 to 10 wt. %.

5. The ink of claim 1 wherein said lactam consists essentially of at least one pyrrolidone present in a range from about 7 to 10 wt. %.

6. The ink of claim 1 wherein said dye is present in an amount ranging from 4 to 5 wt. %.

7. The ink of claim 1 consisting essentially of 4% Neazopon Black X52, 10%, $\alpha$-cyclodextrin, 5.5% diethylene glycol, and the balance water.

8. A method for providing a liquid ink having improved waterfastness, comprising
(a) preparing a vehicle comprising, by weight, about 90 to 98 wt. % water and the balance at least one member selected from the group consisting of glycols and lactams;
(b) adding thereto a first amount of a cyclodextrin;
(c) adding thereto a second amount of a water-insoluble dye, said amount of said dye ranging from about 0.5 to 9 wt. % of said ink and wherein said first amount of said cyclodextrin is approximately at least twice the concentration of said dye; and
(d) heating said ink at an elevated temperature ranging from about 40° to 60° C. to form a complex between said cyclodextrin and said dye.

9. The method of claim 8 wherein said second amount of said dye ranges from about 4 to 5 wt. % of said ink.

10. The method of claim 8 wherein said cyclodextrin is selected from the group consisting of $\alpha$-cyclodextrin, $\beta$cyclodextrin, and $\gamma$-cyclodextrin.

11. The method of claim 8 wherein said dye is selected from the group consisting of solvent dyes, vat dyes, and insoluble mordant dyes.

12. The method of claim 8 wherein said at least one glycol is present in a range from about 2 to 10 wt. %.

13. The method of claim 8 wherein said lactam consists essentially of at least one pyrrolidone present in a range from about 7 to 10 wt. %.

14. The method of claim 8 wherein said ink is heated to said elevated temperature for about 6 to 60 hours to form said complex.

15. The method of claim 8 wherein said ink provided has a composition consisting essentially of about 4% Neazopon Black X52 dye, about 10% of $\alpha$-cyclodextrin, about 5.5% glycol, and the balance water.

16. A method of printing a liquid ink onto a print medium through a thermal ink-jet printhead comprising a plurality of resistor pads associated with a plurality of nozzles, said method comprising:
(a) providing said liquid ink comprising, by weight:
 (1) a vehicle comprising about 90 to 98 wt. % water and the balance at least one member selected from the group consisting of glycols and lactams,
 (2) about 0.5 to 9 wt. % of a water-insoluble dye, and
 (3) a cyclodextrin, present in an amount of at least about twice the concentration of said dye; and
(b) energizing one or more of said resistor pads in a predetermined fashion to cause jetting of said ink through one or more of said nozzles to thereby achieve a desired printed pattern.

17. The method of claim 16 wherein said cyclodextrin is selected from the group consisting of $\alpha$-cyclodextrin, $\beta$-cyclodextrin, and $\gamma$-cyclodextrin.

18. The method of claim 16 wherein said dye is selected from the group consisting of solvent dyes, vat dyes, and insoluble mordant dyes.

19. The method of 16 wherein said at least one glycol is present in a range from about 2 to 10 wt. %.

20. The method of claim 16 wherein said at least one lactam is present in a range from about 7 to 10 wt. %.

21. The method of claim 16 wherein said dye is present in an amount ranging from about 4 to 5 wt. %.

22. The method of claim 16 wherein said ink consists essentially of about 4% Neazopon Black X52 dye, about 10% $\alpha$-cyclodextrin, about 5.5% diethylene glycol, and the balance water.